July 24, 1962
C. BROOKS ETAL
3,046,174
METAL REINFORCED VINYL PLASTIC STRIPPING
Filed Jan. 20, 1958
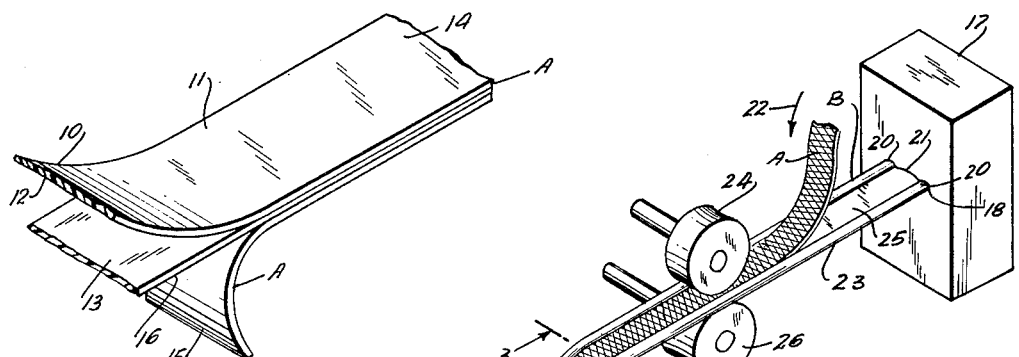
FIG.1
FIG.2
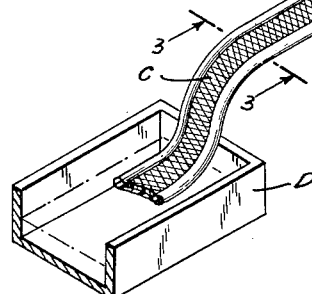
FIG.3
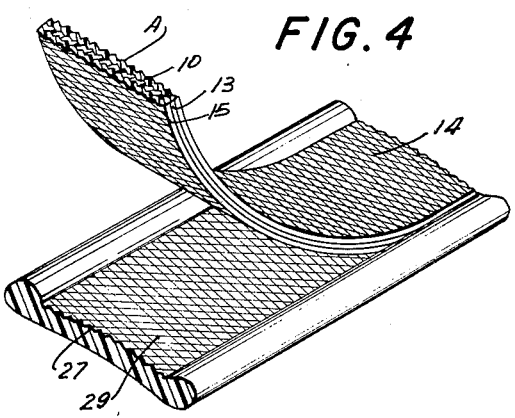
FIG.4
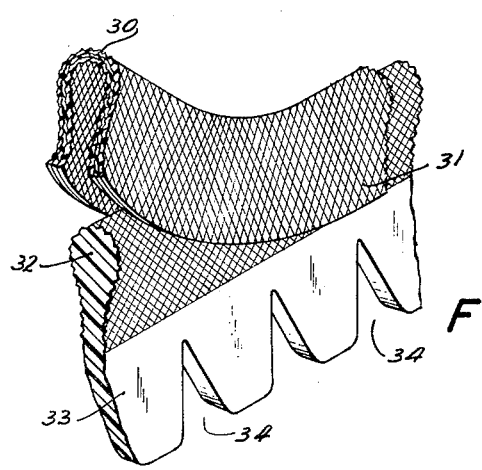
FIG.5
INVENTORS
CHARLES BROOKS
THOMAS A. SUTTON
BY
ATTORNEY United States Patent Office 3,046,174
Patented July 24, 1962

3,046,174
METAL REINFORCED VINYL PLASTIC STRIPPING
Charles Brooks, Forest Hills, and Thomas A. Sutton, Floral Park, N.Y., assignors to Cee-Bee Manufacturing Company, Inc., Brooklyn, N.Y., a corporation of New York
Filed Jan. 20, 1958, Ser. No. 712,057
7 Claims. (Cl. 154—52.1)

The present invention relates to plastic strip materials and it particularly relates to reinforced plastic strip materials.

In making plastic strip materials particularly of vinyl polymers by rolling, casting or extrusion, it has been found particularly difficult to reinforce the same or to strengthen the same without considerable difficulty and without losing the flexibility and pliability of the plastic.

Where the reinforcing material is lodged in the interior of the plastic stripping or film material, the plastic will not too closely adhere to such reinforcing material particularly where the plastic is subjected to considerable flexing or bending in fabrication and usage and where metal wires or strips are utilized for reinforcing purposes, the adhesion or connection between the plastic and the metal is quite poor and can only be improved at great expense and with special fabricating, extrusion, casting or forming procedures.

It is therefore among the objects of the present invention to provide a simple, inexpensive process of laminating or reinforcing plastic sheet materials and particularly vinyl sheet or strip materials which will not increase the cost of production nor detract from the flexibility or desirable properties of the plastic and which at the same time will enable the rapid production of maximum strength extruded or formed plastic or vinyl strips of surprisingly attractive appearance and of maximum strength.

Another object of the present invention is to provide a vinyl plastic fabricating procedure in which the vinyl will be readily reinforced without special metallic skeletons being placed therein and by relatively simple procedures incidental to the forming or extrusion of the plastic.

A further object of the present invention is to provide a novel laminated vinyl plastic material and particularly one in which the vinyl plastic is laminated with metallic sheet materials incidental to the extrusion or forming thereof without increasing cost and without decrease of the flexibility of the vinyl materials and without likelihood of separation after the lamination has been completed.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most suitable according to one embodiment of the present invention to first form a plastic polyethylene terephthalate strip provided with a thin metal stripping which is then applied to the sheet plastic while in heated condition and then cooling the combined product after the combination has been made under pressure.

Surprisingly it has been found that the metal sheeting may be used in almost microscopically thin layers to give adequate surfacing and reinforcement properties and even thin sheets of metal resulting from the deposition of metal vapors in a vacuum have been found to be particularly satisfactory as sufficient reinforcement for relatively thick or heavy vinyl sheeting or stripping.

To enhance the adhesion and assure a permanent bond, it has been found most satisfactory to serrate, corrugate or ridge the polyethylene terephthalate thin metal lamination and then press the corrugated, ridged or serrated strip into the hot semi-fluid plastic material so that the character of the serration, ridging or grooving is actually pressed into the body of the relatively thick vinyl film or sheet and so that the ridges will extend not only through the metallized layer but also into the body of the relatively thick plastic giving alternating areas of increased and decreased compression.

It has further been found most satisfactory to utilize this system of lamination in combination with a convexly curved vinyl plastic sheet or strip which curvature may be slightly actually approaching the flat or may actually extend between quarter cylindrical to half cylindrical to three-quarter cylindrical and even approaching a full round as is true of beading.

It has been found that even though the metal lamination does not extend to the side edges of the extruded vinyl strip or sheet nevertherless the reinforcement effect at the edges is sufficient so that edge splitting or cracking is avoided over indefinitely long periods.

A particularly satisfactory method of applying the metal encased reinforcement is between marginal edges with the reinforcement terminating short of the marginal edges and being applied to a convex surface or to a beaded surface.

The most satisfactory type of vinyl plastic is one which is composed of a polymerized polyvinyl chloride preferably in plasticized and stabilized condition.

It has been found that when this material is extruded and while in hot plastic condition, it may be combined under pressure with thin metallized sheets particularly with sheets that have been corrugated, ridged or serrated so that a highly permanent union is formed which will be rendered quite inseparable if the product is subjected to quick cooling as by immersing in cold water.

The most satisfactory type of lamination has been found to consist of a very thin metal layer preferably of vacuum deposited thickness which is encased between a non-adhesive plastic film and an adhesive plastic film.

In the preferred process a polyester film, such as Mylar, having a thickness ranging from one-half to two or three mils. is vacuum coated with vapors of copper, aluminum, silver, gold, nickel or cobalt or combinations thereof on one side only.

It has been found that if this metallized application is less than one-half mil. in thickness and preferably in the range of one-hundredth to one-tenth mil, the metal is of sufficient thickness to give the reinforcement greatly enhanced unification characteristics.

The exposed side of the metal or the side of the polyester film which has been metallized is then coated by roller coating with a thin adhesive film of the same type of plastic as the base material to be reinforced.

For example, where the plastic is polyvinyl chloride, the adhesive vinyl surfacing on the metallized face is also polyvinyl chloride. However, the plasticizers should be present in greater proportion in the polyvinyl chloride adhesive film than in the base sheet or strip. Desirably the plasticizers in the adhesive strip should be one and one-half to two times the percentage weight of those in the base strip or extruded vinyl plastic.

Where an alkyl phthalate or alkyl ester is used as a plasticizer, the proportion in an adhesive coating should always be greater than the proportion in the base material.

The adhesive layer of vinyl chloride on the underside of the metallized surface is an essential part of the invention. The thin adhesive layer or film which is quite thin causes maximum unification of the application sheet or metallized sheet to the hot base material and the adhesive consists of highly plasticized polyvinyl chloride polymer and it is expected that the plasticizer will migrate from the adhesive film into the hot extruded base material during the combining operation and prior to the immersion in cold water.

With the foregoing and other objects in view, the invention consists of the novel construction, combination and arrangement of parts as hereinafter will be more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 1 is a fragmentary diagrammatic partly separated perspective view showing the various laminations which make up the laminated plastic strippings.

FIG. 2 is a diagrammatic perspective view showing the application of the laminated metallized structure of FIG. 1 to extruded vinyl plastic.

FIG. 3 is a transverse sectional view on the line 3—3 of FIG. 2 showing the final preferred composite structure.

FIG. 4 is a fragmentary perspective view showing the laminated material lifted from its attachment to the extruded plastic strip to show the type of junction which is formed.

Referring to FIG. 1, there is shown the base polyester strip which may be of the type of resin known as Mylar which is usually in very thin sheet form about one-fourth to one mil. in thickness.

The top surface 11 is protected as by a cover strip or by rollers or by a removable covering and the bottom face 12 is then metallized in a vacuum by a thin vacuum deposited coating of silver, gold, tin, aluminum, copper, cobalt or nickel or combinations of these or other metals. This coating need not be more than one-tenth of a mil. and may be as thin as one-hundredth of a mil.

This sheet of polyester resin 10, which is metallized on its side 12, then may be corrugated, ridged or serrated, although this process may be delayed until the adhesive vinyl coating 15 is applied to the metallized side 16.

This composite sheet A containing the metal 13 sandwiched between polyester and vinyl material then may be pressed onto hot semi-fluid polymerized polyvinyl chloride.

The polyvinyl chloride base material B is extruded from extrusion chamber 17 with a slot 18 having a cross-section to give a lower slightly concave face (see FIG. 3), beaded side edges at 20 and a convexly curved valley surface at 21.

This hot polyvinyl chloride material containing about forty to sixty percent of a plasticizer, such as dioctyl phthalate, or di-iso-octyl phthalate, one to two percent of barium, cadmium, tin and/or lead stearate and two to five percent of a stabilizer such as tin, barium, cadmium or zinc mercaptide is extruded at a temperature of about three hundred to four hundred fifty degrees Fahrenheit through the orifice 18.

The composite sheet or combined strip or trilaminate as shown in FIG. 1 and generally designated by the letter A is formed before serration or corrugation or ridging and it may then be corrugated or ridged in the manner indicated in FIGS. 2, 3 and 4 before being pressed into hot extruded base material B between the elevations. The upper face 11 of the top layer is desirably uncoated polyethylene terephthalate film while the middle layer 13 is desirably a vacuum deposited, vacuum evaporated and deposited film of metal such as aluminum. The metallized sides 16 of the composite of the Mylar and the metal B is then combined with the vinyl chloride adhesive film and this combination is referred to as the trilaminate or combined polyester or composite strip A.

Then the composite strip A which has been serrated and grooved is fed in the direction 22 to be formed with the extruded strip 23 and it is pressed by means of the pressure roller 24 into the groove 25 of the extruded material 23 as it passes over the lower base roller 26.

The composite vinyl material or strip indicated at C may then pass into a bath D containing cold water where it will be quickly chilled and where a permanent junction will be formed.

Summarizing FIG. 1 merely diagrammatically illustrates in perspective the principal laminations in the top strip which is indicated as being inserted between the beads 28 in FIGS. 3 and 4 and around the bead 32 in FIG. 5. The exact thickness is not correctly shown but the various laminations are indicated, the top lamination 10 being the sheet of polyester resin which is metallized on its undersurface 12. The metallized layer 13 which is regarded as a separate lamination is attached to the face 12 and is directly under the top polyester lamination 10. The lowermost lamination 15 is a vinyl adhesive coating and this is applied to the opposite face 16 of the metal layer 13, the upper face of which is attached to the underface 12 of the polyester layer 10.

The trilaminate is indicated at A in FIGS. 3 and 4 and at 30 in FIG. 5. The three layers of the trilaminate shown as separate layers at the left of FIG. 1 and joined together as an interval structure at the right of FIG. 1. This composite integral structure is referred to by A and it may also be referred to as a composite strip as well as a trilaminate.

In the embodiment of FIG. 1, the top surface 14 is not shown as being serrated but serrations may be applied as indicated at 14 in FIG. 4 together with the pressure which combines the composite strip A or the trilaminate A into the structures of FIGS. 3, 4 and 5. The adhesive film 15 which is the bottom layer as shown in FIG. 1 is an integral part of the trilaminate or composite strip A and this adhesive consists solely of highly plasticized polyvinyl chloride resin which can be plasticized with an alkylphthalate or a suitable fatty acid ester.

The plasticizer should always be present in the adhesive in a greater proportion than in the base material B of FIG. 3 or 33 of FIG. 5. For example, the plasticizer can be present in the amount of 40 to 60% in the base material B of FIG. 3 or the base material 33 of FIG. 5. It can be present in a greater percentage by 60 to 80% in the adhesive layer 15 in the composite structure of FIG. 1.

In FIG. 3 is shown the base plastic material B with the laminated strip A pressed onto the convexly curved face 27 between the side beads 28.

The strip will be substantially permanently retained in position but to indicate that the corrugation extends into the base strip B a portion of the cover strip A has been lifted showing the indentations at 29 on the convexly curved surface 27 where the pressure squeezes the elevations directly into the base film.

In the beaded material as indicated in FIG. 5, the trilaminate 30 which may be bent at 31 is forced onto the cylindrical beading 32 having the integral attachment flange 33 with the cut-outs 34.

Here too in spite of the cylindrical shape and the necessity of bending the trilaminate almost three hundred sixty degrees, a substantially permanent union will be formed with the indentations which have been formed in the trilaminate being transmitted to the bead 32 by the pressure and resulting in a more permanent union.

The laminated material as indicated in FIGS. 1 and 5, may be applied to both sides of an extruded vinyl strip although the application to one side has been found to be sufficient.

The present invention may be widely used in connection with its application to boys', women's and men's beltings, trimmings for men's, boys' and ladies' hats, ladies' handbags, welting and various trims for shoes; furniture, furniture covers, seat covers, automotive trim both interior as well as exterior of the automotive body; moldings and weltings for edging, sealing or trimming various types of appliances such as electric refrigerators, kitchen cabinets, washing machines, air conditioning equipment, television and radio cabinets, and for wall moldings, edgings and strippings, as well as in various construction work.

The preferred polyester film material referred to by its trademark Mylar is made from polyethylene terephthalate which is a polymer formed by a condensation reaction between ethylene glycol and terephthalic acids.

Although the present invention has a particular application to flexible polymerized polyvinyl chloride it also has a broad application to rigid plastic, such as rigid vinyl polymers, polyethylene and also to a lesser degree to extruded cellulose acetate and butyrate.

While there has been herein described a preferred form of the invention, it should be understood that the same may be altered in details and in relative arrangement of parts within the scope of the appended claims.

Having now particularly described and ascertained the nature of the invention, and in what manner the same is to be performed, what is claimed is:

1. A process of making a reinforcing trilaminate for reinforcement of extruded vinyl chloride polymer plastics which comprises applying a metal deposit to one side of a thin corrugated criss cross diagonally ridged polyethylene terephthalate polyester sheet and then covering the metallized surfacing with a plastic adhesive of substantially the same chemical composition as the base material to which the trilaminate is to be applied, said metallizing resulting from vacuum evaporation and deposition and said application taking place immediately after the extrusion of the vinyl chloride polymer and while said extrusion still retains the heat of said extrusion, followed by immediately chilling in cold water and the vinyl plastic on the face of the metallized surface being merged into the extruded material.

2. A process of making a reinforcing trilaminate for reinforcement of extruded vinyl chloride polymer plastics which comprises applying a metal deposit to one side of a thin corrugated criss cross diagonally ridged polyethylene terephthalate polyester sheet and then covering the metallized surfacing with a plastic adhesive of substantially the same chemical composition as the base material to which the trilaminate is to be applied, said adhesive material consisting of a polyvinyl chloride and the base material consisting of a polyvinyl chloride both being plasticized with dioctyl phthalate and containing small quantities of a heavy metal stearate, said metallizing resulting from vacuum evaporation and deposition and said application taking place immediately after the extrusion of the vinyl chloride polymer and while said extrusion still retains the heat of said extrusion, followed by immediately chilling in cold water and the vinyl plastic on the face of the metallized surface being merged into the extruded material.

3. A process of making a tetra-laminate comprising extruding in hot semi-fluid condition a vinyl chloride polymer having upper convex and lower concave surfaces with side edge beads and applying to the convex surface thereof under pressure a corrugated and serrated trilaminate consisting of a top outside layer of polyethylene terephthalate, an intermediate aluminum metal surfacing formed by vacuum deposition on the terephthalate by sputtering and a contact facing of an adhesive polyvinyl chloride which will form a unitary bond with a convex face.

4. A method of making a Mylar covered composite extruded vinyl polymer which comprises vacuum metallizing with evaporated aluminum metal a thin strip of polyethylene terephthalate film on one side thereof, applying to said same side a plasticized vinyl chloride polymer adhesive layer, serrating the composite metallized polyethylene terephthalate film carrying the adhesive layer, pressing the composite strip into a hot extruded vinyl chloride polymer strip as it is being extruded and before it has chilled and then chilling in cold water.

5. The method of claim 4, said strip being longitudinally recessed and having a convex surface in the recess and said composite film being pressed into the recess by a smooth roller to cause the adhesive layer to unite with the hot polymer strip and to cause the bottom of the recess to conform to the serrations of the composite strip.

6. The polyethylene terephthalate covered extruded vinyl chloride polymer base strip produced according to claim 4 comprised of a narrow extruded strip having longitudinally extending edge elevated rounded beads and a central convexly curved longitudinal recessed portion between the bead a serrated polyethylene terephthalate composite strip integrally united with the polymer strip with its serrations pressed into the base of the recess, said composite strip consisting of a top polyethylene terephthalate film strip and a bottom adhesive vinyl chloride coating merged into the recess of the base strip and an intermediate metallized surfacing on the polyethylene terephthalate film strip.

7. A metallized polyethylene terephthalate covered recessed extruded polyvinyl polymer strip comprising a recessed heavy extruded vinyl polymer base having a recessed central portion with a convex bottom surface and longitudinally extending side beads and a corrugated composite strip composed of a top layer of polyethylene terephthalate, an aluminum metallized surfacing on the underface and an adhesive vinyl polymer surfacing on the metallized surfacing, said composite strip being serrated so that the downwardly projecting portions will be most strongly compressed into the bottom surface and the vinyl polymer surfacing will be merged into extruded strip, said beads covering the side edges of the composite strip.

References Cited in the file of this patent

UNITED STATES PATENTS

| | | |
|---|---|---|
| 2,702,580 | Bateman | Feb. 22, 1955 |
| 2,714,569 | Prindle et al. | Aug. 2, 1955 |
| 2,740,732 | Peck et al. | Apr. 3, 1956 |
| 2,771,388 | Rocky | Nov. 20, 1956 |